United States Patent
McDaniel et al.

(10) Patent No.: US 11,174,770 B2
(45) Date of Patent: *Nov. 16, 2021

(54) POWER GENERATING SYSTEMS AND METHODS FOR REDUCING STARTUP NOX EMISSIONS IN FOSSIL FUELED POWER GENERATION SYSTEM

(71) Applicant: Wellhead Power Solutions, LLC, Sacramento, CA (US)

(72) Inventors: John Grant McDaniel, Sacramento, CA (US); Christian Skov Heiberger, Lincoln, CA (US); Daniel Scott Richardson, Yuba City, CA (US); Paul Zach Cummins, III, Carmichael, CA (US); Andrew Cameron Robertson, Fresno, CA (US)

(73) Assignee: Wellhead Power Solutions, LLC, Sacramento, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/836,597

(22) Filed: Mar. 31, 2020

(65) Prior Publication Data

US 2020/0232361 A1    Jul. 23, 2020

Related U.S. Application Data

(63) Continuation of application No. 16/208,084, filed on Dec. 3, 2018, now Pat. No. 10,669,908.

(51) Int. Cl.
*F01N 3/08* (2006.01)
*F01N 11/00* (2006.01)

(52) U.S. Cl.
CPC ......... *F01N 3/0871* (2013.01); *F01N 3/0842* (2013.01); *F01N 11/002* (2013.01); *F01N 2570/18* (2013.01); *F01N 2610/02* (2013.01)

(58) Field of Classification Search
CPC combination set(s) only.
See application file for complete search history.

(56) References Cited

U.S. PATENT DOCUMENTS 5,282,355 A * 2/1994 Yamaguchi ........ B01D 53/8631
                                                    60/39.182
5,431,894 A * 7/1995 Onishi .................. B01F 5/0456
                                                    423/239.1

(Continued)

FOREIGN PATENT DOCUMENTS

JP    2009-544883 A    12/2009
KR    10-2012-0018999 A    3/2012

(Continued)

OTHER PUBLICATIONS

International Search Report and Written Opinion of the International Searching Authority for International Application No. PCT/US2019/059986, dated Apr. 9, 2020, 15 pages.

(Continued)

*Primary Examiner* — Binh Q Tran
(74) *Attorney, Agent, or Firm* — The Marbury Law Group, PLLC

(57) ABSTRACT

A method of reducing the emission of nitrogen oxides (NOx) during system startup of a power generating system may include igniting a combustion turbine thereby generating exhaust, supplying the exhaust to a catalyst bed comprising a selective catalytic reduction (SCR) catalyst, injecting an initial pulse of ammonia into the exhaust during a storage period such that the NOx reacts with the ammonia and is stored in the catalyst bed as ammonium nitrate (AN) during the storage period; and injecting a scheduled amount of ammonia into the exhaust during a transition period such that the stored AN is decomposed as temperatures increase and NOx is converted via standard and fast SCR reactions during the transition period.

16 Claims, 6 Drawing Sheets

(56) References Cited

U.S. PATENT DOCUMENTS

| | | |
|---|---|---|
| 9,494,070 B2 | 11/2016 | Cho |
| 10,005,016 B2 | 6/2018 | Kippel |
| 2004/0076567 A1 | 4/2004 | Day et al. |
| 2005/0000220 A1 | 1/2005 | Zauderer |
| 2009/0282803 A1 | 11/2009 | Bono et al. |
| 2011/0154806 A1* | 6/2011 | Hoyte ............... G01J 3/10 60/276 |
| 2011/0262333 A1 | 10/2011 | Buzanowski et al. |
| 2011/0274603 A1 | 11/2011 | Kohara et al. |
| 2012/0098276 A1 | 4/2012 | Kraemer et al. |
| 2012/0317989 A1* | 12/2012 | Hoskin ............... F02C 9/54 60/772 |
| 2013/0098462 A1 | 4/2013 | Hoskin |
| 2017/0204771 A1 | 7/2017 | Zhang et al. |
| 2017/0356319 A1* | 12/2017 | Zhang ............... F01N 9/00 |
| 2018/0179939 A1* | 6/2018 | Beutel ............... F23G 7/07 |
| 2018/0238211 A1 | 8/2018 | Kulkarni et al. |
| 2018/0238212 A1 | 8/2018 | Kulkarni et al. |
| 2018/0238214 A1 | 8/2018 | Kulkarni et al. |
| 2018/0238215 A1 | 8/2018 | Kulkarni et al. |
| 2018/0347429 A1 | 12/2018 | Saraswathi et al. |
| 2018/0355776 A1 | 12/2018 | Kippel et al. |
| 2019/0009213 A1 | 1/2019 | Raymand |
| 2019/0010848 A1 | 1/2019 | Sett |
| 2019/0010884 A1 | 1/2019 | Quigley et al. |
| 2019/0022584 A1 | 1/2019 | Hilgendorff et al. |
| 2019/0024557 A1 | 1/2019 | Latrofa et al. |
| 2019/0024563 A1 | 1/2019 | Wang et al. |
| 2019/0024567 A1 | 1/2019 | Joo |
| 2019/0032533 A1 | 1/2019 | Solbrig et al. |
| 2019/0040778 A1 | 2/2019 | Nilsson et al. |
| 2019/0053330 A1 | 2/2019 | Everly et al. |
| 2019/0054419 A1 | 2/2019 | Luo et al. |
| 2019/0054420 A1 | 2/2019 | Li et al. |
| 2019/0054448 A1 | 2/2019 | Kiyonaga et al. |
| 2019/0055868 A1 | 2/2019 | Keturakis |
| 2019/0055871 A1 | 2/2019 | Kiyonaga et al. |

FOREIGN PATENT DOCUMENTS

| | | |
|---|---|---|
| KR | 10-1497828 B1 | 3/2015 |
| WO | 2008-126118 A1 | 10/2008 |

OTHER PUBLICATIONS

International Preliminary Report of Patentability of the International Searching Authority for International Application No. PCT/US2019/059986, dated Jan. 29, 2021, 6 pages.

* cited by examiner

POWER GENERATING SYSTEMS AND METHODS FOR REDUCING STARTUP NOX EMISSIONS IN FOSSILE FUELED POWER GENERATION SYSTEM

RELATED APPLICATIONS

This application is a continuation of and claims priority to U.S. patent application Ser. No. 16/208,084 entitled "POWER GENERATING SYSTEMS AND METHODS FOR REDUCING STARTUP NOx EMISSIONS IN FOSSILE FUELED POWER GENERATION SYSTEM" filed Dec. 3, 2018, the entire contents of which are hereby incorporated by reference for all purposes.

FIELD

The present invention is directed to power generating systems, and in particular to power generating systems and methods for reducing NOx emissions through controlled ammonia injection during startup.

BACKGROUND

The baseload on a grid is the minimum level of demand on an electrical grid over a span of time, for example, one week. This demand can be met by unvarying power plants, dispatchable generation, and/or by a collection of smaller intermittent energy sources, depending on which approach has the best mix of low cost, availability and high reliability in any particular market. The remainder of demand, varying throughout a day, may be met by peaking power plants, which can be operated intermittently, such as during periods of peak power demand.

In an effort to reduce carbon dioxide emissions generated by conventional fossil fuel power plants, the use of renewable energy sources, such as wind and solar, has been mandated in many jurisdictions. However, such renewable energy sources generate power intermittently, namely when the wind blows and the sun shines. Thus, the increasing deployment of renewable energy systems on the power grid is increasing the need for peaking power plants to start and stop frequently to ensure power is delivered to the grid during periods of high renewable power generation variability. An attractive solution for meeting the need for peaking power is the deployment of gas turbine generator plants that burn natural gas because such plants can be started quickly and burning natural gas emits less carbon dioxide per kilowatt that other types of fossil fuel power plants; however, emissions during the start-up cycle of a gas turbine are uncontrolled until the gas turbine can reach stable operating temperatures sufficient to sustain the required reduction reactions.

SUMMARY

Various embodiments power generating systems that include: a combustion turbine configured to generate electrical power by burning natural gas exhaust; a catalyst module configured to receive the exhaust from the turbine and convert nitrogen oxides (NOx) in the exhaust, the catalyst module comprising a catalyst bed comprising a selective catalytic reduction (SCR) catalyst, and a temperature sensor configured to detect a temperature of the exhaust entering the catalyst bed; an injection module configured to inject ammonia prior to the stable operating temperature sufficient to sustain the required reduction reactions (storage period) into the catalyst module; and a control system configured to control an ammonia flow rate of the injection module according to the exhaust temperature detected by the temperature sensor such that during a startup period the NOx reacts with the injected ammonia and is stored in the catalyst bed as ammonium nitrate (AN). The startup period begins after ignition of the combustion turbine and ends when the detected exhaust temperature reaches about 554° F.

Various embodiments also include methods of reducing the emission of nitrogen oxides (NOx) from a power generating system during system startup, the methods comprising: igniting a combustion turbine of the power generating system, thereby generating exhaust that is supplied to a catalyst bed comprising a selective catalytic reduction (SCR) catalyst; injecting an initial pulse of ammonia into the exhaust in the catalyst module during a storage period in which the NOx reacts with the ammonia to form ammonium nitrate (AN) that is stored in the catalyst bed; and injecting a scheduled amount of ammonia into the exhaust in the catalyst module during a transition period such that the stored AN is decomposed as temperatures increase and NOx is converted via standard and fast SCR reactions during the transition period.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

Figure 1:
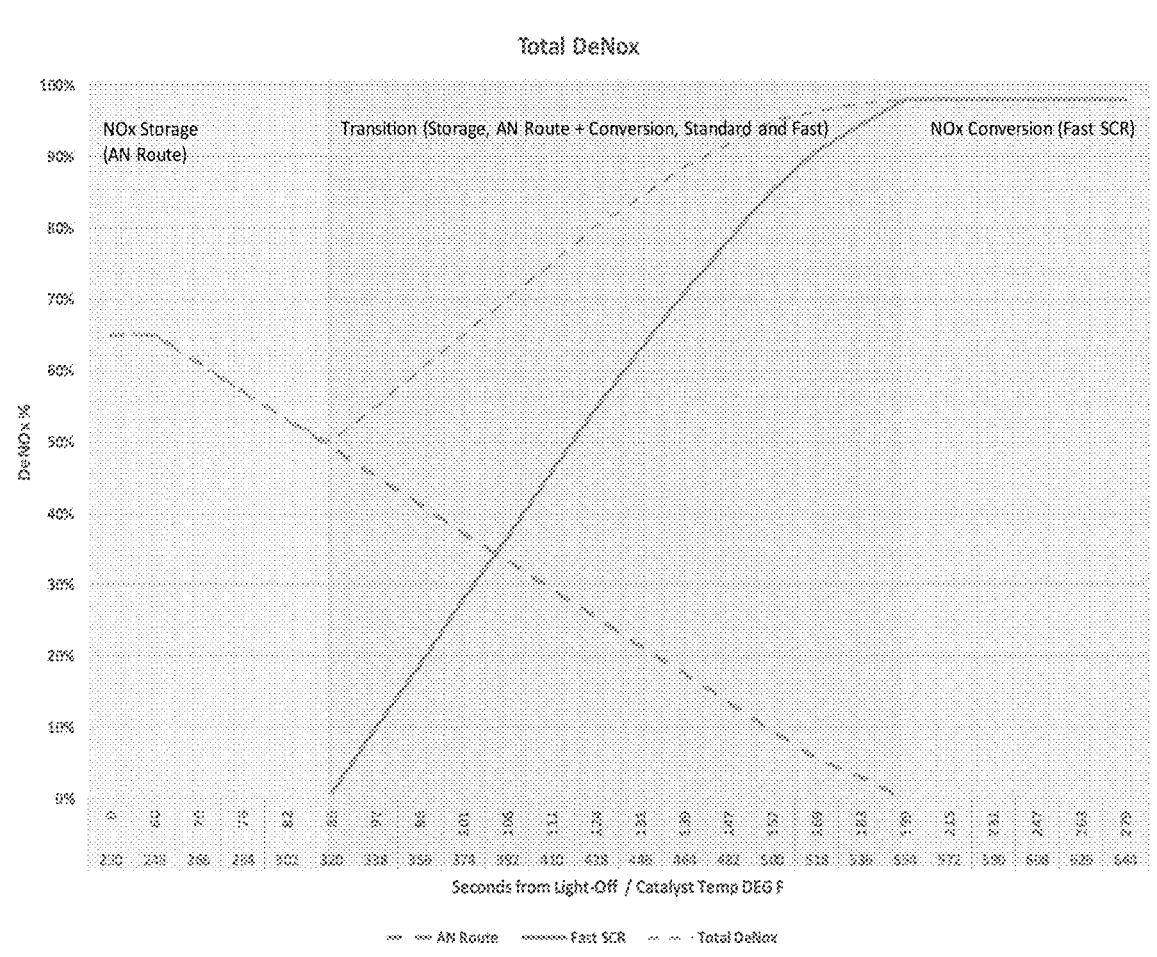
FIG. 1 is a graph showing NOx conversion rates for different reactions at different temperatures and times after startup of a gas turbine burning natural gas.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Fossil fuel power plants generate electrical power by combusting fossil fuels (e.g., natural gas) to generate heat, and then converting the heat energy into mechanical energy that is used to turn an electrical generator. For example, a combined cycle power plant is a particularly efficient type of fossil fuel power plant that uses a gas turbine burning natural gas to in conjunction with a heat recovery steam generator (HRSG) that provides steam to a steam turbine. It is referred to as a combined cycle power plant because the system combines the Brayton cycle of the gas turbine with the Rankine cycle of the steam turbine. However, simple-cycle or open cycle gas turbine plants, which do not include a steam cycle, are commonly used for emergency or peaking power generation capacity, but exhibit a much lower thermal efficiency. The high running cost per hour is offset by the low capital cost and the intention to run such units only a few hundred hours per year.

Exhaust gas generated by the combustion of the fossil fuels is discharged to the air. This gas contains carbon dioxide and water vapor, as well as pollutants such as nitrogen oxides (NOx) and sulfur oxides ($SO_x$). To reduce air pollution, most fossil fuel power plants include system for removing some or all of such pollutants.

NOx may be removed from exhaust gas by a process such as selective catalytic reduction (SCR). SCR involves converting NOx into diatomic nitrogen ($N_2$) gas and water ($H_2O$) using a catalyst and a gaseous reactant. Typically, ammonia vapor from an ammonia source is added to an exhaust gas stream as a gaseous reactant and is adsorbed onto a catalyst.

The ammonia source may be anhydrous ammonia, aqueous ammonia, or urea, for example. Pure anhydrous ammonia is typically favored by large industrial SCR operators because it needs no further conversion to operate within an SCR. However anhydrous ammonia is extremely toxic and difficult to safely store. Aqueous ammonia should be vaporized prior to use, but it is substantially safer to store and transport than anhydrous ammonia. Urea is the safest to store, but requires conversion to ammonia through thermal decomposition in order to be used as an effective reductant.

SCR catalysts generally include an active catalyst supported on a carrier. For example, the carrier may include a high surface area, porous, ceramic material, such as titanium oxide, titanium dioxide, titanium trioxide, of the like. The active catalyst may include oxides of a base metal such as vanadium, molybdenum, and/or tungsten, zeolites, and various precious metals.

The two most common designs for SCR catalysts are honeycomb-type and plate-type. Plate-type catalysts have lower pressure drops and are less susceptible to plugging and fouling than the honeycomb-type, but plate configurations are much larger and more expensive. Honeycomb configurations are smaller than plate-type catalyst, but have higher pressure drops and plug much more easily.

Beginning at an exhaust temperature of about 320° F. (160° C.), NO in an exhaust stream may react on an SCR catalyst bed via "standard SCR reactions", which may be exemplified by the following reactions:

$4NO+4NH_3+O_2 \rightarrow 4N_2+6H_2O$; and     1.

$4NO+4NH_3+O_2 \rightarrow 4N_2+6H_2O$.     2.

In addition, $NO_2$ present in an exhaust stream may react with ammonia on an SCR catalyst bed via "fast SCR reactions", which may be exemplified by one of the following reactions:

$2NO_2+4NH_3+O_2 \rightarrow 3N_2+6H_2O$;     3.

$NO+NO_2+2NH_3 \rightarrow 2N_2+3H_2O$; and     4.

$6NO_2+8NH_3 \rightarrow 7N_2+12H_2O$.     5.

At exhaust temperatures below about 554° F. (290° C.) NOx may react with ammonia to form ammonium nitrate ($NH_4NO_3$) via the "ammonium nitrate route" ("AN route"), which may be exemplified by the following reactions:

$2NH_3+2NO_2 \rightarrow NH_4NO_3+N_2+H_2O$; and     6.

$2NH_3+2NO_2+H_2O \rightarrow NH_4NO_3+NH_4NO_2$.     7.

The ammonia injection rate into the exhaust in the catalyst module during the SCR process may be precisely controlled. An insufficient injection rate may result in unacceptably low NOx conversions. An injection rate that is too high results in release of undesirable ammonia to the atmosphere. These ammonia emissions from SCR systems are known as "ammonia slip". Ammonia slip generally increases at higher $NH_3/NOx$ ratios. In the dominant standard SCR reaction of Equation (1), the stoichiometric $NH_3/NOx$ ratio in the SCR system is about 1:1. Ratios higher than 1:1 may significantly increase ammonia slip. In practice, ratios between 0.9:1 and 1:1 are most often utilized, in order to minimize ammonia slip while still providing satisfactory NOx conversion.

FIG. 1 is a graph showing a comparison of the NOx removal percentages (DeNOx %) of the AN route and the standard and fast SCR reactions with respect to a total amount of NOx conversion as a function of time or exhaust temperature. Referring to FIG. 1, at a temperature of about 320° F. (160° C.) substantially all of the NOx in an exhaust stream may be in the form of NO. As such, all or substantially all NOx conversion may occur via the standard SCR reactions. However, as exhaust stream temperatures increase, the relative concentration of $NO_2$ also increases until, at temperatures above about 460° F. (238° C.), the $NO_2$ concentration exceeds the NO concentration, thereby favoring the fast SCR reactions.

The reaction rate of the fast SCR reactions may be ten times that of the standard SCR reactions. Accordingly, at temperatures above about 554° F. (290° C.), substantially all NOx conversion may occur through the fast SCR reactions.

The AN route reactions have a negative temperature coefficient and the fast SCR reactions have a positive temperature coefficient. In other words, as the exhaust stream temperature is reduced below about 554° F. (290° C.), the reaction rate of the fast SCR reactions decreases, until at about 320° F. (160° C.) the reaction rate of the fast SCR reactions becomes negligible. In contrast, the reaction rate of the AN route is negligible about 554° F. (290° C.), but as temperatures are reduced the reaction rate increases, such that the reaction rate of the AN route exceeds that of the SCR reactions at temperatures below about 392° F. (200° C.), and substantially all NOx is reacted via the AN route at temperatures of about 320° F. (160° C.) or less.

Utilizing the AN route may result in the buildup of ammonium nitrate in an SCR catalyst, which may result in plugging and/or temporary deactivation of the SCR catalyst bed with ammonium nitrate. In addition, in $NH_3$ injection systems that utilize aqueous ammonia or urea as a $NH_3$ source, due to the safety concerns with the use of anhydrous ammonia, $NH_3$ injection does not occur until such systems reach a temperature sufficient to vaporize the NH$_3$ source. While some conventional NH$_3$ delivery systems may take up to two hours to reach NH$_3$ injection temperatures, some fast start combustion turbines may achieve NH$_3$ injection in approximately 15 to 20 minutes.

Accordingly, during startup of conventional power generating systems, ammonia is not injected into exhaust gas until the exhaust gas reaches about 554° F. (290° C.), in order to prevent plugging of the SCR catalyst bed with AN, and because NH$_3$ may be unavailable for injection, due to the operating temperature requirements of ammonia injection systems. Further, the AN storage capability of an SCR catalyst bed generally has a negative temperature coefficient. In addition, the required feed of rate of ammonia to NOx varies with the NO$_2$ content of the NOx, and the response time of typical slip stream NOx analyzers is too slow to optimize a delivery schedule during a transition period when the exhaust stream has a temperature ranging from above 320° F. (160° C.) to about 554° F. (290° C.).

Consequently, conventional power generating systems generally emit exhaust gas containing NOx into the environment during a startup period. These uncontrolled emission startup periods can vary from site to site due to a number of variables, including turbine ramp rate, temperature sensor delay due to mass heating of thermowells, and the operating temperatures of NH$_3$ injection equipment. For example, NOx may be emitted into the environment for from about 10 to about 30 minutes, during the startup of conventional power generating systems.

In contrast to conventional power generating systems, various embodiments provide power generating systems that utilize precisely controlled ammonia injection during system startup to reduce the emission of NOx during the startup period. In particular, various embodiments provide power generating systems that intentionally generate and store ammonium nitrate on SCR catalyst beds during system startup in order to reduce startup NOx emissions. The stored ammonium nitrate decomposes as system temperatures exceed about 336° F. (168° C.) via the following reaction:

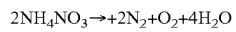

$$2NH_4NO_3 \rightarrow 2N_2 + O_2 + 4H_2O$$

Power Generating Systems

Figure 2:
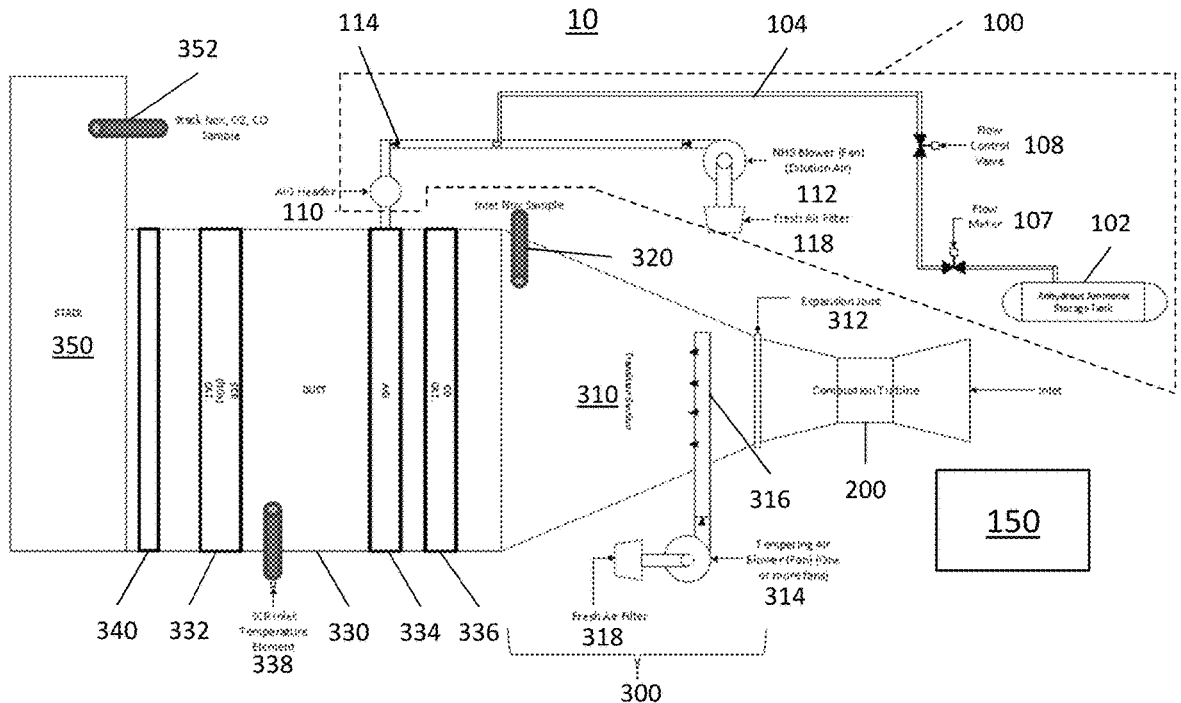
FIG. 2 is schematic view of a gas turbine power system, according to various embodiments.

FIG. 2 is a schematic view of an example power generating system 10 configured to reduce NOx emissions during system startup according to various embodiments of the present disclosure. Referring to FIG. 2, the system 10 may include an ammonium injection module 100, a combustion turbine 200, an exhaust inlet module 300, a catalyst module 330, and a control system 150.

The combustion turbine 200 may be a natural gas burning combustion turbine, for example. However, the combustion turbine 200 may operate using any suitable combustion fuel. In some embodiments, the system 10 may include any other suitable type of combustor, such as a boiler, furnace, or the like. As discussed below, the system 10 may be particularly applicable for operation in a natural gas peaking power plants.

In various embodiments, the injection module 100 may be configured to operate using an anhydrous ammonia source. The injection module 100 may include a storage tank 102 configured to store anhydrous ammonia. For example, the storage tank 102 may be a reinforced metal tank configured to store anhydrous ammonia at a high pressure.

The injection module 100 may include an ammonia conduit 104 configured to fluidly connect the storage tank 102 to an injection conduit 114. The injection module 100 may include a flow control valve 108 configured to control the flow of ammonia through the ammonia conduit 104 to the injection conduit 114. The injection module 100 may include a flow meter 107 disposed on the ammonia conduit 104 and configured to detect an ammonia flow rate through the ammonia conduit 104.

The injection module 100 may include a blower 112 (e.g., a fan) configured to provide air to the injection conduit 114, and a filter 118 configured to filter ambient air provided to the blower 112. The injection module 100 may include a mixer 110 disposed on the injection conduit 114. The mixer 110 may be configured to mix the gaseous ammonia source provided from the ammonia conduit 104 with the air provided by the blower 112.

The resultant ammonia mixture may be provided to an ammonia injection grid 334 (AIG) fluidly connected to the injection conduit 114 and/or mixer 110. In some embodiments, ammonia injection nozzles may be used in place of the AIG 334. The blower 112 and the flow control valve 108 may be controlled to control an ammonia content of the ammonia mixture.

The exhaust inlet module 300 may include an exhaust inlet conduit 310 configured to fluidly connect the catalyst module 330 and the combustion turbine 200. The exhaust inlet conduit 310 may be configured to receive an exhaust stream generated by the combustion turbine 200. In some embodiments, the exhaust inlet module 300 may include an expansion joint 312 configured to connect the exhaust inlet conduit 310 and the combustion turbine 200. The expansion joint 312 may be configured to compensate for thermal expansion and contraction differences that may occur due to heating and cooling of the combustion turbine 200 and the exhaust inlet conduit 310.

The exhaust inlet conduit 310 may operate to reduce the speed of and/or increase the volume of the exhaust stream received from the combustion turbine 200. For example, the volume of the exhaust inlet conduit 310 may increase with distance from the combustion turbine 200, such that the velocity of the exhaust stream may be reduced and the volume of the exhaust may be increased.

The exhaust inlet module 300 may include a tempering blower 314 fluidly connected to a dilution manifold 316. The tempering blower 314 may be configured to provide external air to the dilution manifold 316, which may be configured to inject the air into the exhaust stream. As a result, the volume of the exhaust stream may be increased and/or the temperature of the exhaust stream may be decreased. The exhaust inlet module 300 may include an inlet gas sampler 320 disposed adjacent to the catalyst module 330. The inlet gas sampler 320 may be configured to sample and/or detect a NOx concentration in the exhaust stream prior to entering the catalyst module 330. For example, the inlet gas sampler 320 may be configured to provide gas samples to an external gas composition analyzer, or may include a gas composition analyzer.

The catalyst module 330 may be configured to fluidly connect the exhaust inlet conduit 310 to an exhaust stack or flue 350. As discussed in detail below, the catalyst module 330 may be configured to generate deNOx exhaust by reducing an amount of NOx included in the exhaust stream.

The catalyst module 330 may include may include a SCR catalyst bed 332 and an ammonia injection grid (AIG) 334. In some embodiments, the catalyst module 330 may include multiple catalyst beds 332 disposed downstream of one another with respect to a flow direction of the exhaust stream. The catalyst module 330 may also include one or more a carbon monoxide catalyst beds 336 disposed upstream of the SCR catalyst bed 332, with respect to a flow direction of the exhaust stream. The catalyst module 330 may also include at least one temperature sensor 338, disposed upstream of the SCR catalyst bed 332. For example, the temperature sensor 338 may be configured to detect the temperature of the exhaust stream prior to entering the SCR catalyst bed 332. In some embodiments, the temperature sensor 338 may be a thermistor or any other suitable temperature sensor capable of operating in a high-temperature environment of an exhaust stream.

The AIG 334 may be fluidly connected to the injection conduit 114. The AIG may be configured to inject ammonia received from the injection conduit 114 into the exhaust stream, prior to the exhaust stream entering the SCR catalyst bed 332.

The stack 350 may be configured to receive the exhaust stream flowing out of the catalyst module 330. The system 10 may include a stack gas sampler 352 configured to provide gas samples to an external gas analyzer, or may include a gas analyzer. In some embodiments, the stack gas sampler 352 may be configured to detect the concentration of $NH_3$, NOx, O2, and/or CO in the exhaust stream in the stack 350.

The control system 150 may include a central processing unit and a memory configured to store operating software and/or firmware. The control system 150 may be wired or wirelessly connected to and/or configured to control the operation of various elements of the system 10, such as the flow control valve 108, the blowers 112, 314, etc. For example, the control system 150 may be configured to control the injection of the ammonia into the exhaust in the catalyst module 330 according to the temperature detected by the temperature sensor 338, and/or gas compositions detected using the gas samplers 320, 352, so as to control NOx emissions and/or ammonia slippage, during startup and steady-state operations of the system 10, as discussed in detail below. For example, the control system 150 may be configured to reduce the ammonia flow rate of the injection module 100, if the gas sampler 352 detects an ammonia concentration that exceeds a threshold concentration.

During steady-state operation, the turbine 200 generates high-temperature exhaust gas, such that the inlet module 300 is provided with exhaust gas having a temperature of at least 600° F. (315° C.), such as a temperature ranging from about 600° F. (315° C.) to about 800° F. (427° C.), or higher. In some embodiments, the tempering blower 314 may be operated to reduce the temperature of the exhaust gas to about 600° F. (315° C.). Ammonia is injected into the exhaust gas stream using the injection module 100, and the exhaust gas and ammonia are then provided to the SCR catalyst bed 320. Accordingly, NOx and ammonia react on catalyst bed 332 at a temperature of at least about 554° F. (290° C.), via the fast SCR reaction, since the catalyst beds 132 are maintained at approximately the same temperature as the exhaust stream.

Therefore, during steady-state operation the catalyst bed 332 operates to reduce NOx and generate $N_2$ and $H_2O$, via the fast SCR reactions, and thereby generate exhaust gas that has a very low NOx content. For example, the catalyst bed 332 may reduce at least 90% of the NOx in the exhaust stream, such as from about 95% to about 99.5% of the NOx.

Prior to startup, the SCR catalyst bed 332 may be at approximately ambient temperature. In some embodiments, the SCR catalyst bed 332 may be preloaded with ammonia. For example, excess ammonia may be applied to the SCR catalyst bed 332 when the system 10 is shut down after previous steady-state operation. In some embodiments, the control system 150 may be configured to control the injection module 100, to inject ammonia into the catalyst beds 132 in excess of NOx conversion requirements, when the system 10 is shut down, such that the SCR catalyst bed 332 is preloaded with ammonia for use during a subsequent startup of the system 10.

During startup, the combustion turbine 200 is ignited. An exhaust stream output from the combustion turbine 200 is then provided to the catalyst module 330 via the inlet module 300, and ammonia is injected into the catalyst module 330. In some embodiments, ammonia may optionally be injected into the catalyst module 330, prior to igniting the turbine 200. The injection of ammonia may be precisely controlled to limit NOx emission and ammonia slip, as discussed in detail below with regard to FIGS. 6 and 7.

According to various embodiments of the present disclosure, the system 10 may optionally include an AN bed 340 disposed in the catalyst module 330 downstream of the catalyst bed 332. The AN bed 340 may be configured to sequester AN that bypasses the catalyst bed 332. Accordingly, the AN bed 340 may operate to increase the AN storage capacity of the system 10. The AN bed 340 may be formed of a non-precious metal or a ceramic material. In some embodiments, the AN bed 340 may have a high surface area to increase AN storage sites.

Figure 3:
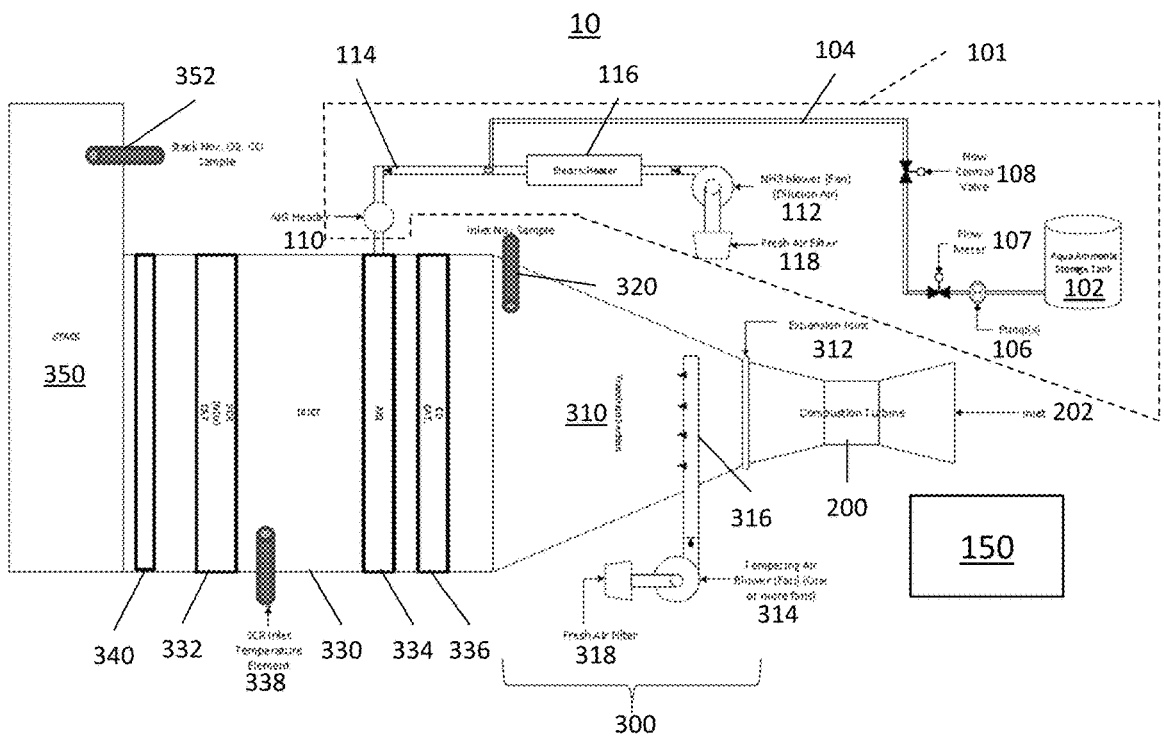
FIG. 3 is a schematic view of the gas turbine power system of FIG. 2, including a modified ammonia injection system.

FIG. 3 is a schematic view of the power generating system 10 of FIG. 2, including a modified ammonia injection module 101, according to various embodiments of the present disclosure. The injection module 101 may be similar to the injection module 100 of FIG. 2. Accordingly, only the differences therebetween will be discussed in detail.

Referring to FIG. 3, the injection module 101 is configured to operate using an aqueous ammonia source, such as aqueous ammonia or urea. The flow control valve 108 may be configured to control the flow of the ammonia source through the ammonia conduit 104.

The injection module 101 may include a heater 116 disposed on the injection conduit 114 and configured to heat the air provided by the blower 112. The heater 116 may include a resistive heating element. In other embodiments, the heater 116 may include a combustion element configured to burn a fuel provided to the combustion turbine 200 or any other suitable fuel.

The injection module 101 may include a mixer 110 disposed downstream of the heater 116. The mixer 110 may be configured to mix the aqueous ammonia source provided through the ammonia conduit 104 with the heated air to facilitate vaporization of the ammonia. The vaporized ammonia may then be provided to the AIG 334.

Figure 4:
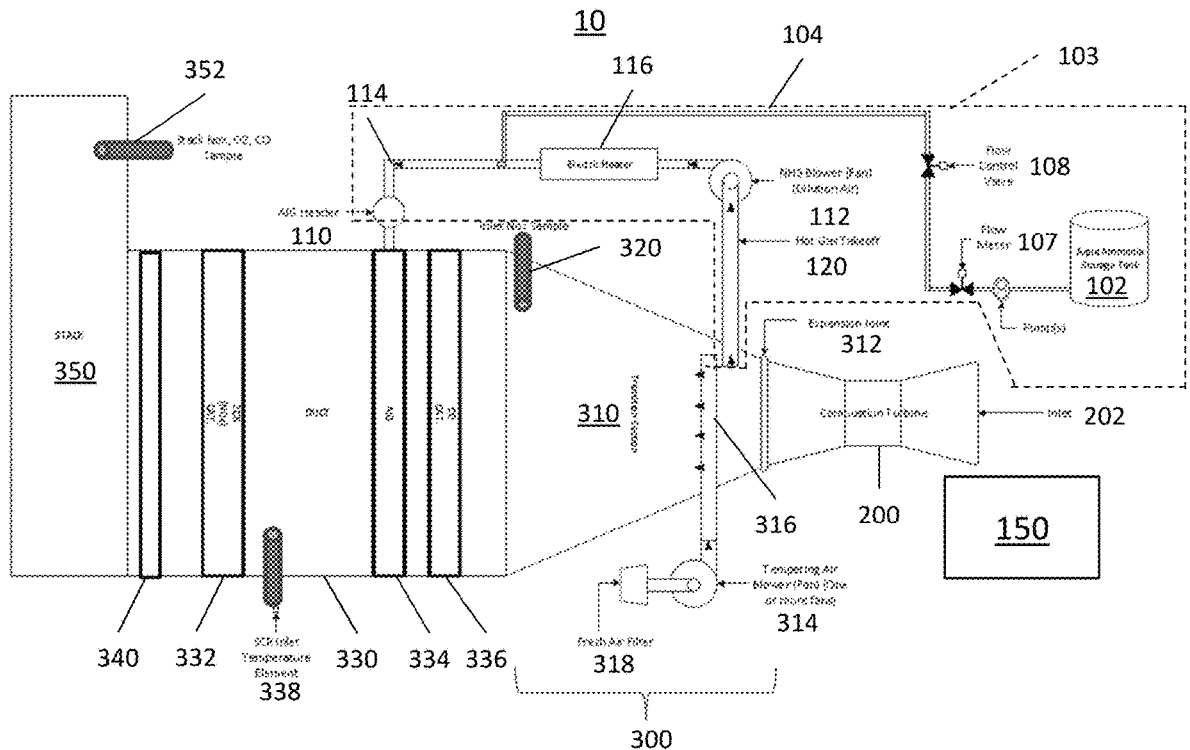
FIG. 4 is a schematic view of the gas turbine power system of FIG. 3, including a modified ammonia injection system.

FIG. 4 is a schematic view of the power generating system 10, including a modified ammonia injection module 103, according to various embodiments of the present disclosure. The injection module 103 may be similar to the injection module 101 of FIG. 3. Accordingly, only the differences therebetween will be discussed in detail.

Referring to FIG. 4, the injection module 103 may be configured to operate using the aqueous ammonia source, such as aqueous ammonia or urea. The injection module 103 may include the heater 116 disposed on the injection conduit 114 and configured to heat the air provided by the blower 112.

The injection module 103 may include a takeoff conduit 120 fluidly connecting the exhaust inlet conduit 310 to the blower 112. In particular, the takeoff conduit 120 may be configured to provide hot exhaust gas to the injection conduit, when the combustion turbine 200 is generating a hot exhaust stream, during steady-state operation. An inlet of the takeoff conduit 120 may be disposed upstream of the dilution manifold 316 to receive the hottest portion of the exhaust stream.

During startup, the heater 116 may be operated to heat the air in the injection conduit to a temperature sufficient to vaporize the ammonia source. For example, the heater 116 may be operated before startup of the combustion turbine 200 and/or until the combustion turbine 200 generates exhaust that is heated sufficiently to vaporize aqueous ammonia and generate an amount of ammonia vapor sufficient to react with the NOx generated by the combustion turbine 200.

Figure 5:
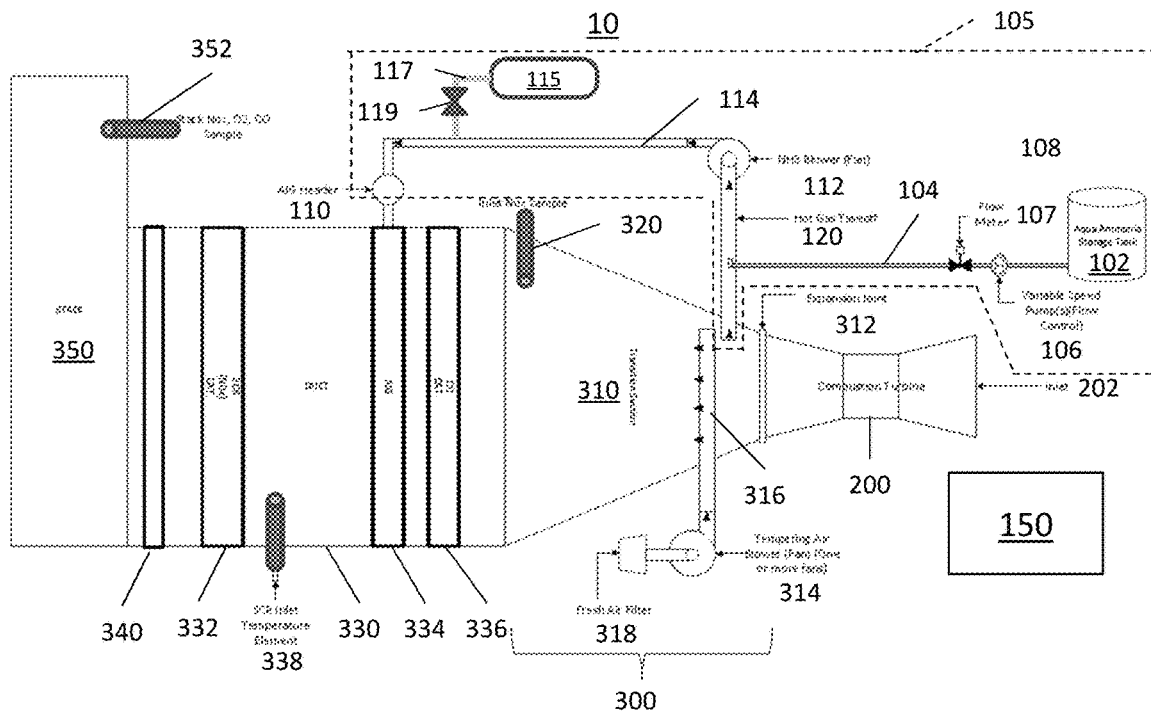
FIG. 5 is a schematic view of the gas turbine power system of FIG. 4, including a modified ammonia injection system.

FIG. 5 is a schematic view of the power generating system 10, including a modified ammonia injection module 105, according to various embodiments of the present disclosure. The injection module 105 may be similar to the injection module 103 of FIG. 4. Accordingly, only the differences therebetween will be discussed in detail.

Referring to FIG. 5, the injection module 105 is configured to operate using the aqueous ammonia source, such as aqueous ammonia or urea. The injection module 105 may include the takeoff conduit 120 fluidly connecting the exhaust inlet conduit 310 to the blower 112.

The ammonia injection module 105 may include an ammonia conduit 104 fluidly connecting the tank 102 to the takeoff conduit 120. Accordingly, the ammonia source may be supplied to the takeoff conduit 120, upstream of the blower 112. As such, the aqueous ammonia source may be mixed with the hot exhaust provided from the exhaust inlet conduit 310, while the provided exhaust remains at a high temperature. Therefore, in some embodiments, the configuration of the ammonia injection module 105 may generate ammonia vapor in less that about 1 minute after light-off of the combustion turbine 200, such as within about 45 seconds of light-off of the combustion turbine 200, or less.

In some embodiments, the ammonia injection module 105 may optionally include an ammonia booster system including a booster tank 115, a booster conduit 117, and a flow control valve 119, and a flow meter (not shown). The booster conduit 117 may be configured to fluidly connect the booster tank 115 to the injection conduit 114. The booster tank 115 may be configured to contain anhydrous ammonia or a pressurized aqueous ammonia source. The flow control valve 119 may be configured to control ammonia and/or ammonia source flow through the booster conduit 117. The booster system may be configured to provide an initial amount of ammonia to the AIG 334 during system startup. For example, the booster system may be configured to supply an initial pulse of ammonia or ammonia source to the AIG 334, during system startup and/or before the exhaust stream reaches an ammonia vaporization temperature.

Methods of Pollution Control

Figure 6:
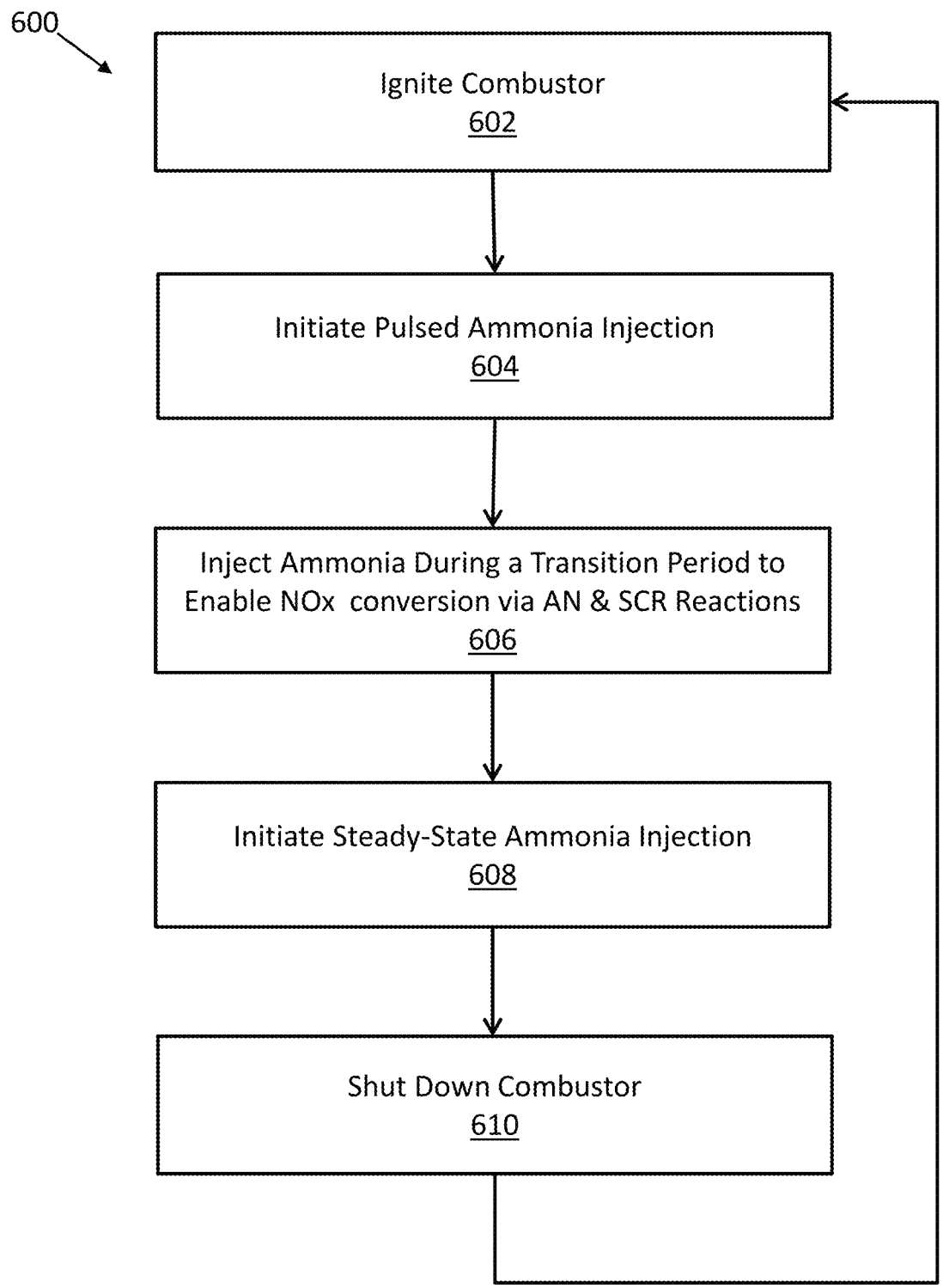
FIG. 6 is a process flow diagram illustrating a pollution control method according to various embodiments.

FIG. 6 is a process flow diagram illustrating a startup pollution control method 600 for a power generation system including a combustion turbine, such as a combustion turbine, according to various embodiments of the present disclosure. The method 600 may be implemented in a control system, such as the control system 150, configured to control various elements of the power generation systems of any of FIGS. 2-5.

Referring to FIG. 6, in operation 602, the control system may ignite the combustion turbine to begin generating power, resulting in a combustion exhaust stream from the combustion turbine being supplied to a SCR catalyst bed. As combustion exhaust begins to flow through the SCR catalyst bed, NOx in the exhaust stream reacts with ammonia preloaded in the SCR catalyst bed during a previous operation of the power generating system, forming ammonium nitrate that may be stored in the SCR catalyst bed.

In operation 604, the control system may initiate ammonia pulse injection. The control system may pulse the ammonia injection to compensate for flow maldistributions in the SCR catalyst bed that may occur during system startup. In some embodiments, the control system may initiate pulsed injection concurrently or substantially concurrently with combustion turbine activation. For example, if the system includes an ammonium injection module that utilizes aqueous ammonia or urea, the control system may activate a heater to preheat the ammonia injection module and generate vaporized ammonia. Similar injection initiation start times may also be obtained if the system includes an ammonium injection module that utilizes anhydrous ammonia.

In the alternative, if the system includes an ammonia injection module that utilizes heat from the combustion turbine to generate vaporized ammonia and that does not include a heater, the control system may begin pulsed ammonia injection at from about 30 seconds to about two minutes after activation of the combustion turbine, such as from about 45 seconds to about 90 seconds after activation of the combustion turbine, or about 60 seconds after activation of the combustion turbine.

In some embodiments, operation 604 may include the control system generating an initial pulse of ammonia after starting the combustion turbine and before the exhaust stream reaches a temperature of about 320° F. (160° C.) and ammonia begins reacting with NOx via the standard SCR reactions. In other words, the initial pulse may occur during an ammonium nitrate (AN) storage period where NOx in the exhaust stream is stored in the SCR catalyst as ammonium nitrate (AN) and the SCR reactions do not occur at an appreciable rate.

In some embodiments, the initial pulse may inject an amount of ammonia into the SCR catalyst bed that is in excess of an amount of ammonia consumed by the ammonium nitrate reactions during the NOx storage period. Accordingly, ammonia may remain in the SCR catalyst until a transition period where the temperature of the exhaust stream increases from about 320° F. (160° C.) to about 554° F. (290° C.).

For example, in some embodiments, the control system may control the ammonia flow rate during the NOx storage period to between about 15% and 30%, such as between about 17% and about 28%, as between about 18% and about 22%, or about 20%, based on a 100% maximum flow rate of the ammonia injection module. In general, an ammonia flow rate of about 26% would be sufficient to provide an approximately 1:1 ammonia to NOx ratio during steady-state combustor operation at a minimum stable operating load of the combustor, and an ammonia flow rate of about 75% would be sufficient to provide an approximately 1:1 ammonia to NOx ratio during steady-state combustor operation at a full operating load of the combustor.

In operation 606, the control system may control ammonia injection into the exhaust stream during a transition period according to a schedule such that as temperatures increase the stored AN is decomposed and NOx is converted via standard and fast SCR reactions. During the transition period may encompass temperatures at which both the ammonium nitrate reactions and the standard and/or fast SCR reactions may occur. In particular, the control system may receive temperature readings from temperature sensors in the exhaust path and begin scheduled SCR ammonia injection once the exhaust stream reaches a temperature of about 320° F. (160° C.), which is a temperature at which NOx conversion via the fast SCR reactions becomes statistically significant.

Also as part of operation 606, the control system may inject additional pulses of ammonia during the transition period to enable additional NOx storage in the catalyst via the ammonium nitrate reaction. In other words, the ammonia pulses may be in addition to the amount of ammonia injected during the fast SCR schedule. The additional ammonia provided by the pulse injection(s) during the transition period (i.e., in operation 606) may allow for additional NOx storage via the ammonium nitrate reaction. In other words, the ammonia pulses provide more ammonia than is consumed by the fast and/or standard SCR reactions at a given temperature.

In some embodiments, the initial pulse may provide a sufficient amount for ammonia to feed the AN reaction during the transition period. In this case, operation 606 may not include additional pulses during the transition period.

As the temperature of the exhaust stream increases during the transition period in block 606, the control system may increase the scheduled amount of ammonia injection according to the corresponding reaction rate of the fast SCR reactions. For example, the control system may increase the ammonia flow percentage from 0% to about 27%, as the temperature of the exhaust stream increase from about 320° F. (160° C.) to about 554° F. (290° C.), during the transition period.

In operation 608, the control system may initiate steady-state ammonia injection once the exhaust stream reaches about 554° F. (290° C.). For example, the control system may control the ammonia flow rate to provide sufficient ammonia to react with from about 95% to about 99.5% of the NOx included in the exhaust stream via the fast SCR reactions.

In operation 610, the control system may shutdown the combustion turbine and power generation may be stopped, such as when the grid no longer needs peaking power. In some embodiments, operation 610 may include the control system injecting an amount of ammonia during system shut-down that is in excess of the amount of ammonia that reacts with NOx so that unreacted ammonia is preloaded into the SCR catalyst bed. In particular, the control system may control the flow rate of the ammonia injection so that unreacted ammonia accumulates in the SCR catalyst bed during system shut-down. For example, the ammonia injection rate may be controlled such that as much ammonia as possible impregnates the SCR catalyst bed without generating a significant amount of ammonia slippage.

In some embodiments, the control system may receive signals from an ammonia sensor downstream catalyst module and use such data to control the ammonia flow rate such that an ammonia slippage rate is less than about 1%, such as less than about 0.5%, or less than about 0.2%, based on a total amount of injected ammonia, or less than a specific site permit allowable concentration in parts per million. In some embodiments, the control system may control the ammonia flow rate between about 15% and 25%, such as between about 17% and about 22%, or about 20%.

Figure 7:
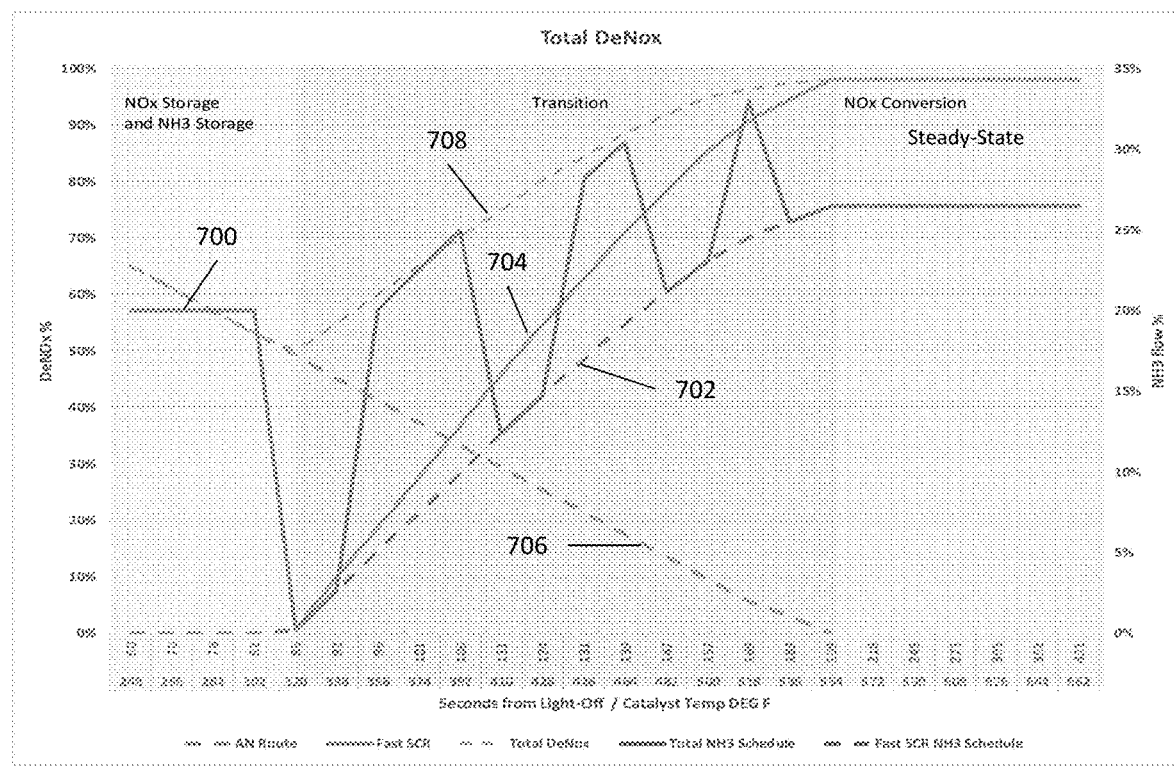
FIG. 7 is a graph showing ammonia injection rates that may be utilized during the method of FIG. 6 and corresponding NOx conversion percentages.

FIG. 7 is a graph showing ammonia injection rates that may be utilized during the method of FIG. 6 and corresponding NOx conversion percentages. Referring to FIG. 7, line 700 shows the ammonia flow rate during the NOx storage period, transition period, and steady-state operational periods, and line 702 indicates scheduled ammonia flow rates for the fast SCR reactions. Line 704 shows fast SCR reaction NOx conversion percentages, line 706 shows ammonium nitrate conversion percentages, and line 708 shows total deNOx percentages. The total deNOx percentage refers to a total amount of NOx that is converted into AN and stored and/or that is catalytically decomposed by SCR reactions.

As shown in FIG. 7, the flow rate of ammonia is initially pulsed during the NOx storage period. The amount of ammonium provided by the initial pulse may be set such that the substantially all of the ammonia is converted into ammonium nitrate and stored during the NOx storage period. Accordingly, the initial pulse results in the storage of NOx that would be emitted into the atmosphere by conventional power systems.

During the transition period, the ammonia flow rate is periodically pulsed above the scheduled fast SCR flow rate by the control system. As a result, the pulses result in the storage of AN and subsequent conversion of additional NOx, as compared using only the fast SCR reaction, by utilizing the ammonium nitrate route and of the storage capacity of the SCR catalyst bed. It is believed that the periods between pulses allow for ammonium nitrate accumulated in the SCR catalyst bed to be decomposed, thereby preventing catalyst plugging and/or deactivation.

Figure 8:
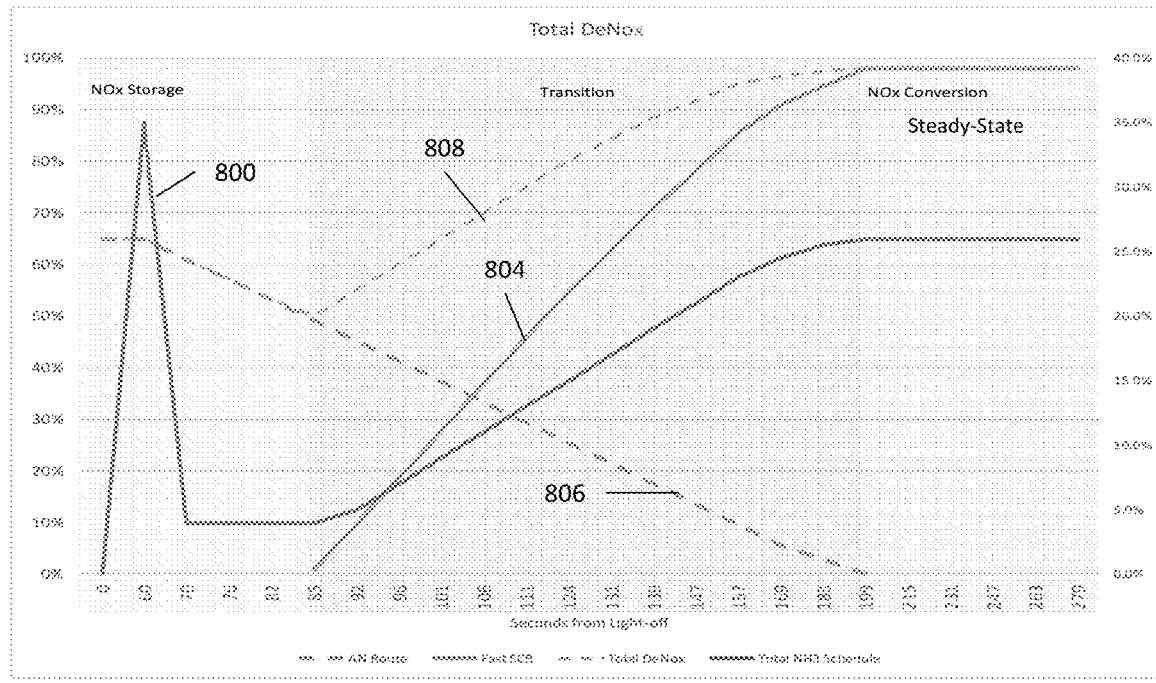
FIG. 8 is a graph showing alternative ammonia injection rates that may be used during the method of FIG. 6 and corresponding NOx conversion percentages.

FIG. 8 is a graph showing alternative ammonia injection flow rates that may be utilized by the control system implementing the method 600 of FIG. 6 and the corresponding NOx conversion percentages. Referring to FIG. 8, line 800 shows the ammonia flow rate during the NOx storage period, transition period, and steady-state operational periods, and line 802 indicates the scheduled ammonia flow rate for the fast SCR reaction. Line 804 shows the fast SCR reaction NOx conversion percentage, line 806 shows the ammonium nitrate reaction NOx conversion percentage, and line 808 shows the total deNOx percentage for both reactions (e.g., a total percentage of NOx that is catalytically converted or stored).

As shown in FIG. 8, in instances in which the ramp speed of the combustion turbine exceeds the feedback time of temperature sensors due to thermo-well mass, and/or delays due to slip-stream NOx sensors, a timer may be used to as a proxy to inform the feed and pulse rates. In some instance, the start ramp has been found to be fast enough that a single initial ammonia pulse may be sufficient to utilize all available SCR catalyst bed space in conjunction with supplying additional ammonia according to the SCR schedule. As such, a single initial pulse may be sufficient to reduce NOx emission during system startup, by utilizing both ammonium nitrate storage and fast SCR conversion.

In various embodiments, in order to prevent excessive ammonium nitrate accumulation, the control system may suppress the pre-Fast SCR feed rates following any start that failed to reach about 554° F. (290° C.) so as to prevent AN from building up in excess. $NH_3$ sensors may be located in the exhaust stack with sensor data provided to the control system to enable the control system to take actions to ensure that $NH_3$ is not overfed and slipped to the atmosphere. In some embodiments, the power generating system may also include an in-stream inlet NOx analyzer to provide high speed data regarding NOx and/or $NO/NO_2$ concentrations to the control system to enable more accurate control of ammonia feed rates during the transition from SCR Reaction to Fast SCR Reaction.

Figure 9:
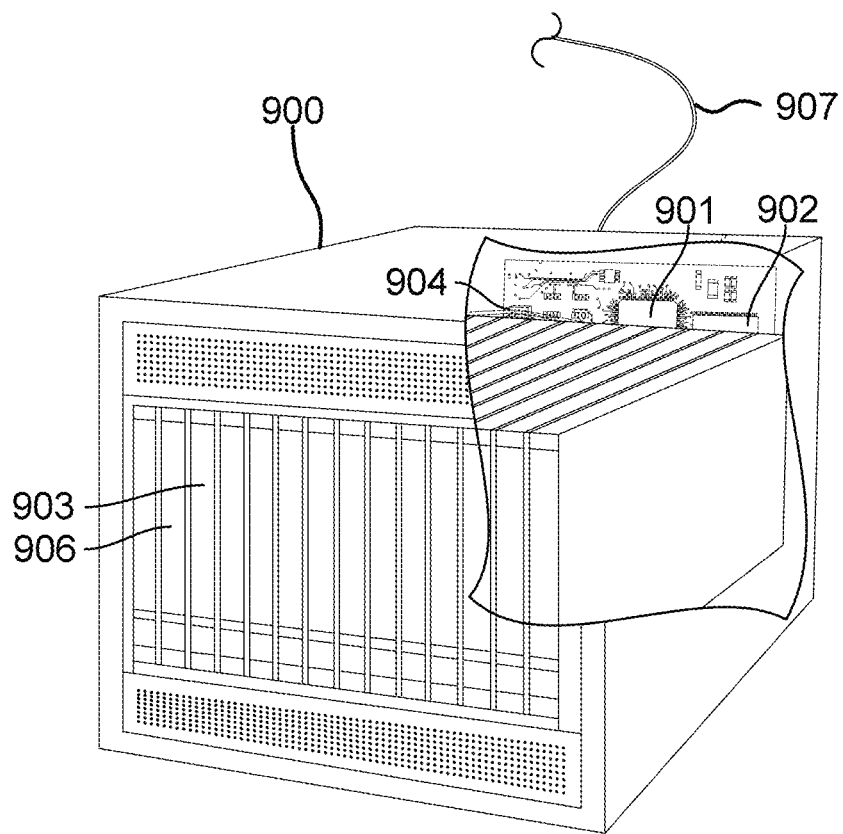
FIG. 9 is a component block diagram of a computing system that may be configured as a control system to implement methods in accordance with various embodiments.

FIG. 9 illustrates a computing system 900 that may be configured as a control system (e.g., control system 150) to implement the methods of various embodiments. computing system 900 typically includes a processor 901 coupled to volatile memory 902 and a large capacity nonvolatile memory, such as a disk drive 903. The computing system 900 may also include a floppy disc drive, compact disc (CD) or digital versatile disc (DVD) disc drive 906 coupled to the processor 901. The computing system 900 may also include one or more wired or wireless network transceivers 904, such one or more network access ports and/or wired or wireless modems (e.g., one wired or wireless modem, two wired or wireless modems, three wired or wireless modems, four wired or wireless modems, or more than four wired or wireless modems), coupled to the processor 901 for establishing network interface connections with one or more local networks 907, such as a local area network (e.g., Ethernet, etc.) coupled to the sensors, valves, pumps and controllers of the power generating system to receive sensor data and send control signals for implementing the embodiment methods (e.g., the method 600).

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular. It will also be understood that the term "about" may refer to a minor measurement errors of, for example, +/−5%.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of various embodiments.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the scope of the embodiments. Thus, various embodiments are not intended to be limited to the embodiments shown herein but are to be accorded the widest scope consistent with the following claims and the principles and novel features disclosed herein.

What is claimed is:

1. A system for reducing nitrogen oxide (NOx) emissions from a combustion turbine of a power generating system, comprising:
   a catalyst module configured to receive exhaust from the combustion turbine, the catalyst module comprising:
   a catalyst bed comprising a selective catalytic reduction (SCR) catalyst;
   an ammonium nitrate (AN) bed; and
   a temperature sensor configured to detect a temperature of the exhaust entering the catalyst bed;
   an injection module configured to inject ammonia into the catalyst module; and
   a control system coupled to the temperature sensor, the catalyst module and the injection module, and configured to control an ammonia flow rate of the injection module according to the exhaust temperature detected by the temperature sensor, such that, during a startup period, nitrogen oxides (NOx) in the exhaust reacts with the injected ammonia and is stored in the catalyst bed and the AN bed as AN, wherein the startup period begins after ignition of the combustion turbine and ends when the detected exhaust temperature reaches about 554° F.

2. The system of claim 1, wherein the AN bed has a high surface area configured to have a high surface area to increase AN storage sites.

3. The system of claim 2, wherein the AN bed is formed of a non-precious metal.

4. The system of claim 2, wherein the AN bed is formed of a ceramic material.

5. The system of claim 1, further comprising a gas sampler configured to detect a concentration of ammonia in the exhaust output from the AN bed, wherein the control system is configured to receive data from the gas sampler and reduce the ammonia flow rate if the detected ammonia concentration exceeds a threshold concentration.

6. The system of claim 5, wherein the control system is configured to periodically increase and decrease the ammonia flow rate during the startup period such that pulses of ammonia are provided to the catalyst module during the startup period.

7. The system of claim 1, wherein the injection module comprises:
a blower;
an injection conduit fluidly connecting the blower to the catalyst module;
a tank configured to store an ammonia source; and
an ammonia conduit fluidly connecting the tank to the injection conduit.

8. The system of claim 7, wherein the injection module further comprises:
a flow control valve configured to actuate in response to commands from the control system to control ammonia flow through the ammonia conduit; and
a flow meter configured to detect an ammonia flow rate in the ammonia conduit and provide data regarding the detected ammonia flow rate to the control system.

9. The system of claim 8, further comprising a heater configured to heat gas in the injection conduit during startup of the combustion turbine, wherein the ammonia source is aqueous ammonia or urea.

10. The system of claim 9, further comprising a takeoff conduit configured to provide a portion of the exhaust to the blower.

11. The system of claim 9, further comprising an inlet conduit fluidly connecting the combustion turbine to the catalyst module, wherein the takeoff conduit fluidly connects the inlet conduit to the blower.

12. The system of claim 9, wherein the control system is further configured to control the injection system to:
inject an initial pulse of ammonia into the exhaust during a storage period, such that the NOx reacts with the ammonia and is stored in the catalyst bed and the AN bed as ammonium nitrate (AN) during the storage period; and
inject a scheduled amount of ammonia into the exhaust during a transition period, such that AN stored in the catalyst bed and the AN bed is decomposed as temperatures increase and NOx is converted via standard and fast SCR reactions during the transition period.

13. The system of claim 12, wherein the control system is further configured to control the injection system to inject at least one additional pulse of ammonia in excess of the scheduled amount of ammonia to react with the NOx to form ammonium nitrate during the transition period.

14. The system of claim 12, wherein the control system is further configured to:
inject the initial pulse of ammonia before the exhaust temperature reaches about 320° F.; and
control the injection system to initiate injection of a scheduled amount of ammonia after the exhaust temperature reaches about 320° F.

15. The system of claim 12, wherein the control system is further configured to control the injection system to:
inject an excess amount of ammonia into the turbine exhaust stream that exceeds an amount of ammonia that reacts with the NOx while the combustion turbine shuts down such that the AN bed is preloaded with ammonia.

16. The system of claim 1, wherein the injection module further comprises:
a blower;
an injection conduit fluidly connecting the blower to the catalyst module;
a takeoff conduit configured to provide a portion of the exhaust to the blower;
a tank configured to store an aqueous ammonia source; and
an ammonia conduit fluidly connecting the tank to the takeoff conduit.

* * * * *